May 20, 1941.  T. J. WALSH  2,242,666
CAMERA
Filed March 29, 1938  5 Sheets-Sheet 1

INVENTOR.
Thomas J. Walsh
BY
ATTORNEYS.

May 20, 1941. T. J. WALSH 2,242,666
CAMERA
Filed March 29, 1938 5 Sheets-Sheet 2

INVENTOR.
Thomas J. Walsh
BY
ATTORNEYS.

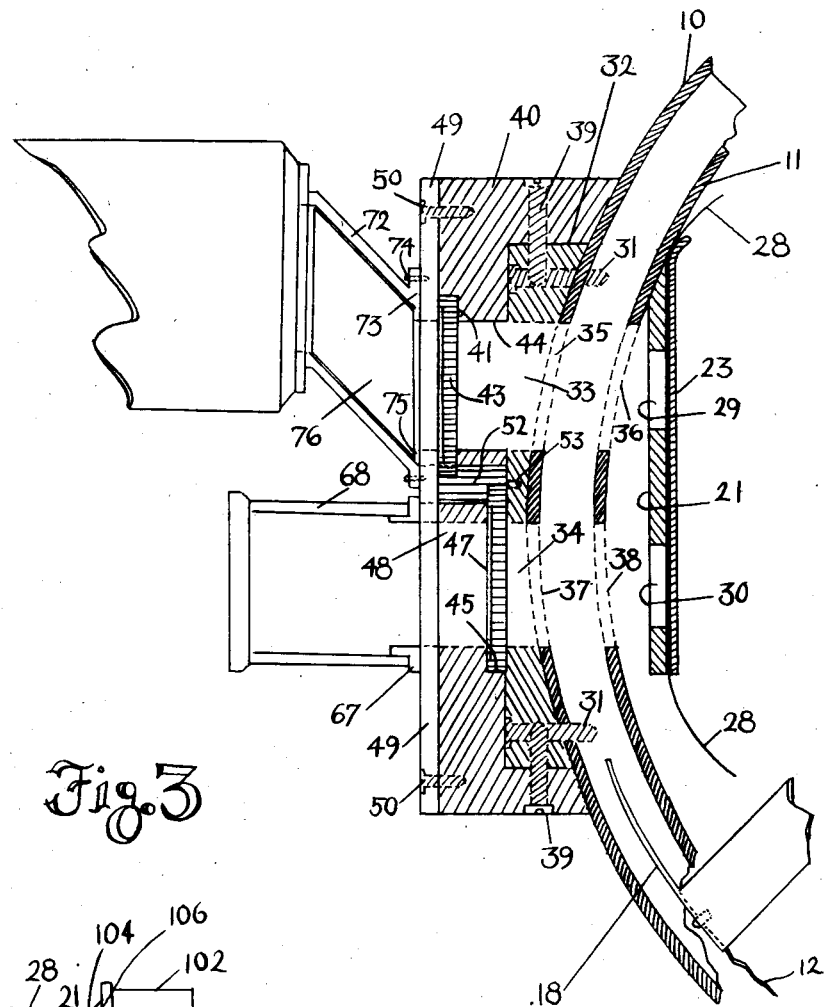

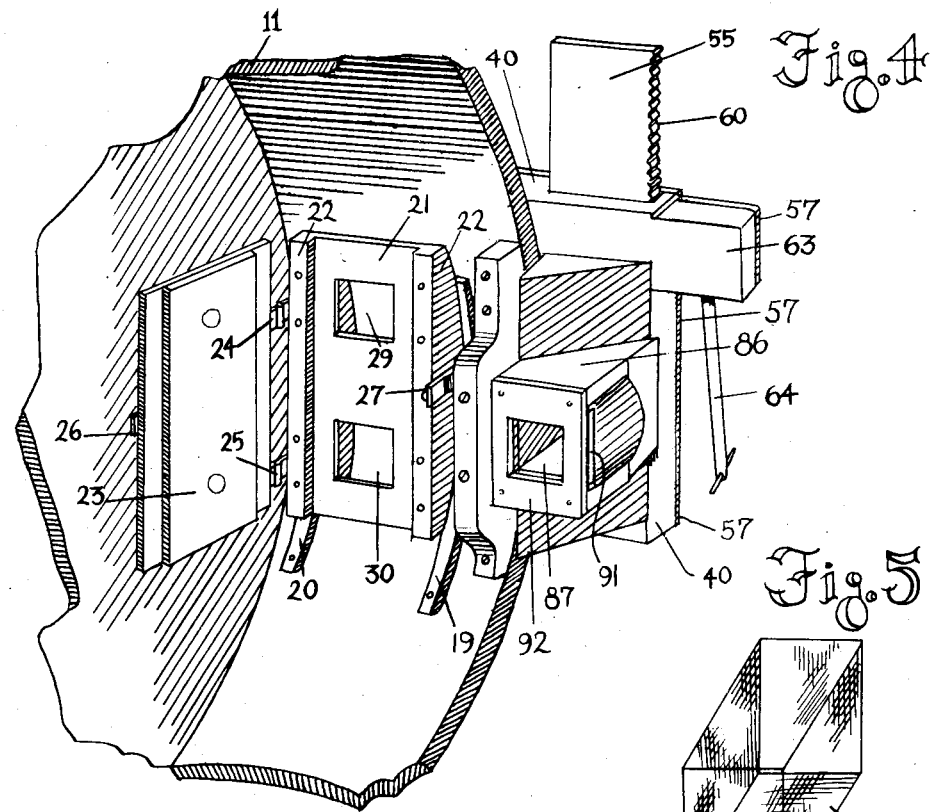

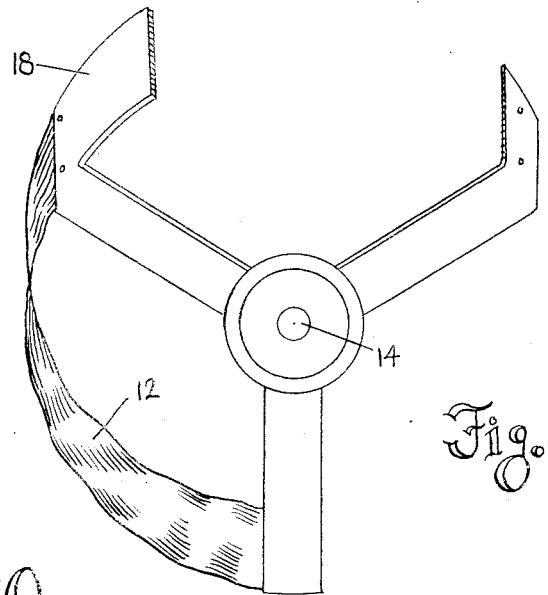
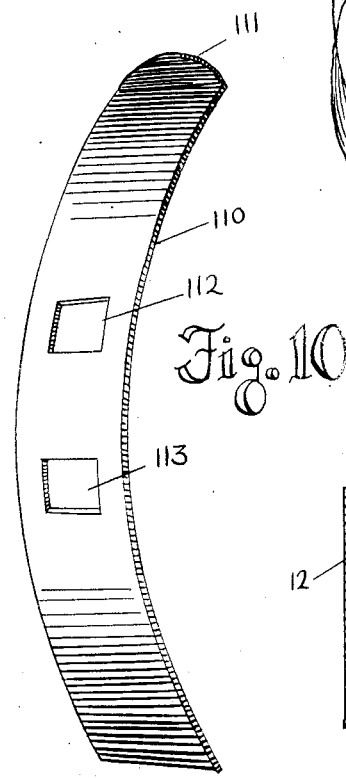
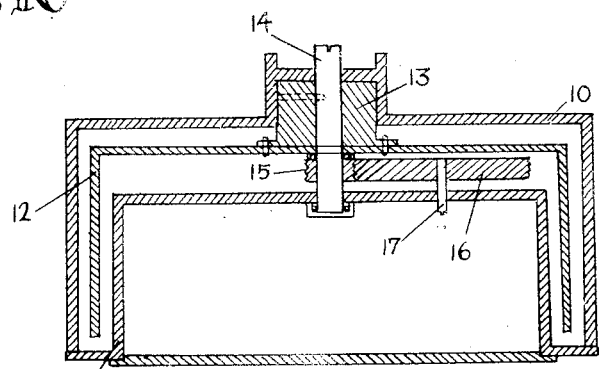
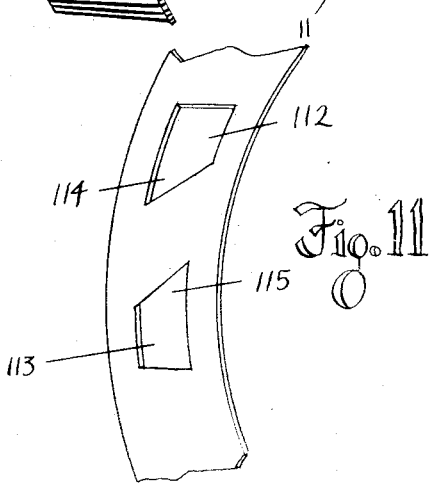

Patented May 20, 1941

2,242,666

UNITED STATES PATENT OFFICE 2,242,666

CAMERA

Thomas J. Walsh, West Hempstead, N. Y., assignor to Patrick Nardell, Bronx County, N. Y., and Joseph Ladaga and William L. Morris, both of New York, N. Y., jointly Application March 29, 1938, Serial No. 198,639

10 Claims. (Cl. 88—16)

The present invention relates to cameras in which, on the usual single strip of moving film, an object may be pictured through a plurality of lenses of different foci or quality, as for instance through a normal or long-shot lens and through a close-up lens, and in which means are provided for interchangeably and at will exposing the film to light through one or the other of the lenses without interruption of the feed of the film; to the end that a continuity of views on the film may show the object or scene at apparently varying distances and in varying detail.

An object of the invention is the provision, in a camera of this character, of means for properly, promptly, and without any measurement of distances, "finding" the object, while the camera, selectively and at will, is set and reset for one or the other lens, during continuous feed of the film.

In its preferred form, the "finder" equipment of the invention comprises the usual ground glass image plate and eye-piece connections. Instead, however, of having a finder lens mounted in permanent registry with the image plate, it comprises a plurality of finder lenses, one for each photographing lens, and mounted for interchangeable registry with the image glass, according to the photographing lens to be used.

It is an object of the invention, in its preferred form, to have the mechanism which controls the selection of the photographing lenses, connected to the mechanism which selects the finder lens therefor, so that, in setting the camera for any photographing lens, the proper finder lens is automatically registered with the image plate; or, to state it otherwise, the setting of the finder automatically sets the camera for the desired photographing lens.

A further object of the invention is a control, preferably a manually operable finger piece, whereby, at any instant during the feed of the film, and at the will of the operator, the photographing lenses and corresponding finder lenses may be changed from long-shot to close-up, and vice versa.

Motion picture cameras ordinarily have a restricted area at a so-called aperture plate through which light from the lens may reach the film. Practical considerations generally preclude substantial enlargement of this area. Whether, therefore, in the use of the present invention, a single aperture serves both lenses, or there be a separate aperture for each lens, the light from the lenses must, as to most of the present standard cameras, fall at or about the same point at the aperture plate. On the other hand, the mountings of the plurality of lenses employed in the present invention must not be so close to one another that one may interfere with or obstruct the light or vision of the other.

It is expedient, therefore, to have the lens mountings well separated at the front of the camera, and by some means to effect a convergence of the rays therefrom to the aperture plate; and means for this purpose is a further object of the present invention.

In the embodiment of the invention hereinafter described, a convergence of light rays, from well separated lenses, to the same or closely adjacent points of an aperture plate, is effected by an arrangement of prisms; of which there need be only one when only one of the lenses is offset with respect to its aperture in the aperture plate, or of which there may be two when both lenses are so offset.

In cameras of the class first above described, the change from long-shot to close-up, and vice versa, need not be abrupt, but may be a slow one, whereby to produce on the film what is known as a "dissolve" effect. It is an object of the present invention to provide for such effects.

A feature and object of the invention in its preferred embodiment, but which, in association with an aperture plate having two apertures, one for each lens, may or may not be employed, without affecting the other objects and features of the invention, is a shutter, preferably a slide, so mounted with respect to the aperture plate as to close one aperture thereof and open the other. It may be actuated so as to progressively or gradually let out one view and let in a succeeding view, thus producing the "dissolve" effect. This shutter or slide preferably has an aperture for each of the apertures of the aperture plate, so spaced therealong that when one of the plate apertures is completely closed by the slide, the other plate-aperture is completely open.

It will be understood that this shutter or slide for "dissolve" effects may be used as an auxiliary to other mechanism, such as irises, which open and close the long-shot and close-up lens in the normal operation of the camera; and that when such irises are present, and the shutter slide is also used, the irises should be set so that both lenses are sufficiently open for admission of proper light to the then slide-controlled aperture plate. If desired, the shutter slide may be a complete substitute for the irises or other shutters ordinarily used to open and close the lenses;

because by quick shift of the slide the change from long-shot to close-up, and vice versa, may be effected without appreciable "dissolve."

In the use of the aforesaid shutter or slide, in addition to irises or other shutters, it is an object of the invention to equip the camera for the production of so-called "trick" dissolves. To this end, the side walls of the apertures of the slide may be inclined, so that the "dissolve" may be from right to left, or vice versa, as well as forward, as when the apertures are rectangular. Other shapes of slide apertures may be had, to produce other unusual dissolves.

Other objects and features of the invention will more fully appear upon reference to the accompanying drawings, in which:

Fig. 3 is a view in cross-sectional side elevation; taken on the line 3—3 of Fig. 2; the lens supports being in place, however.

Fig. 4 is a perspective view, looking into the camera casing from the rear.

Fig. 5 is a perspective view of the close-up prism.

Fig. 6 is a perspective view of a container for the close-up prism.

Fig. 7 is a perspective view of a support for the close-up lens chamber, and of the means whereby it is mounted upon the device of Fig. 6.

Fig. 8 is a perspective view of a so-called "Akeley" ribbon shutter, adapted to the present invention.

Fig. 9 is a reduced view in cross-sectional side elevation, taken through the center of the drum and film roll casings, and showing the ribbon shutter and part of its drive mechanism.

Fig. 10 is a perspective view of the "wiper".

Fig. 11 is a view of a modified form of wiper.

Fig. 12 is a diagrammatic view of a modified prism arrangement, for use when both lens supports are offset from the plate apertures therefor.

Figure 1:
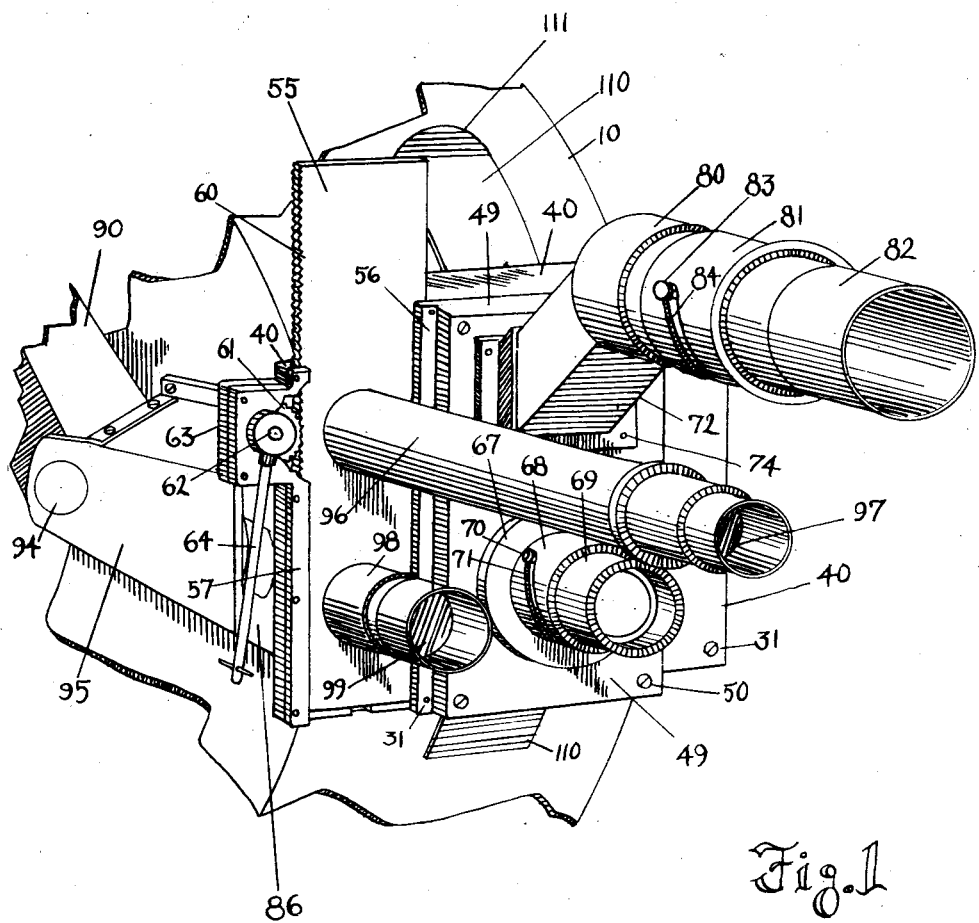
Fig. 1 is a perspective view of the front of a so-called "Akeley" camera adapted to the present invention; parts to the rear being broken away.

In the drawings, the invention is shown in an embodiment thereof adapted to the so-called and well known "Akeley" camera. This camera comprises a drum-shaped casing 10, within which, (see Figs. 3 and 9), is set a casing 11 for the film delivery and pick-up rolls, (not shown). The shutter 12, (see Figs. 8 and 9), revolves in a space between the outer and inner casings 10 and 11. The shutter carries a hub 13 for bearing on the drum 10, and is driven by shaft 14. The film rolls, not shown, are driven in well known manner from shaft 14 as by gears 15, 16 and shaft 17. In Fig. 8 the shutter is shown as a spider, to two arms of which the shutter ribbon is attached; and one arm of which has a wing 18 in continuation of the ribbon, for a purpose presently to be shown.

An aperture plate 21 forms part of a frame 22 secured to the inner face of casing 11 by metal straps 19 and 20, (see Fig. 4). The film gate 23, (see Fig. 4), is pivoted at 24 and 25 to frame 22. In Fig. 3 the gate is shown as closed; and in Fig. 4 as opened. It is held closed by spring latch pieces 26 and 27. It is opened for insertion and removal of film. In Fig. 3, a piece of film 28, coming from the delivery roll, (not shown), and passing to the pick-up roll, is shown in frame 22 between the aperture plate and the closed gate. This general structure, except for the fact that here the aperture plate has two apertures, 29 and 30, instead of the usual single aperture, is well known.

The aperture 29 will hereinafter be referred to as the close-up aperture, and the aperture 30 as the long-shot aperture. For reasons presently to appear, the two apertures 29 and 30 are preferably spaced apart the distance of one picture panel on the film.

Secured to the front face of the drum 10, as by means of screws 31, which pass therethrough and into the drum at points to either side of the shutter containing space, is a block 32 having its inner face shaped to the drum. As shown in Fig. 3, this block has apertures 33 and 34 therethrough, in registration with the apertures 29 and 30 in the aperture plate 21, and with aligned apertures 35, 36, 37 and 38 in the casings 10 and 11.

Set against the front face of the block 32, and held thereto by screws 39 is a block 40. In the upper front face of block 40 is a countersink 41 in which are set an iris 42 and an iris actuating gear plate 43 for the close-up photographing lens. An opening 44 extends from the countersink 41, through the block 40, in registration with the upper aperture 29 of the aperture plate 21. Lower, in the rear face of the block 40, in registration with the lower aperture 30 of the aperture plate 21, is a countersink 45 in which is set an iris 46 and an iris actuating gear plate 47 for the long-shot photographing lens. An opening 48 extends forward therefrom through the block 40. The leaves of the iris 46 and the gear 47 are held against displacement by the face of block 32 and by the shoulder formed by countersink 45 in block 40. The leaves of iris 42 and the actuating gear plate 43 are held against displacement by the shoulder formed by countersink 41 and by a plate 49 secured as by screws 50 on the front of block 40.

The iris structure and operation may be of well known type, such for instance as shown in U. S. Letters Patent 1,392,876, dated October 4, 1921, to Leonard; in which event each iris leaf will carry a pin pivotly set into a pin hole in the shoulder formed by the countersink 41 or 45, as the case may be, and the gears 43 and 47 will be radially slotted, each slot to receive one of the iris leaf pins; so that proper rotary movement of the gears 43 and 47 will swing the iris leaves on their pivots to open and close the irises. The pin and slot structure just described, being shown in the Leonard patent referred to, is not here shown or described in detail.

In a boring 51 through block 40, (see Figs. 2 and 3), is a pinion 52, centered by a bearing pin 53 on plate 32, and meshing with the gear 43 of the close-up iris. Gear 43 in turn meshes with gear 47 of the long-shot iris. It follows that when pinion 52 rotates, and according to its direction of rotation, one of the irises opens and the other closes. It will be understood that other types of iris may be employed. The face plate 49 serves to hold the pinion 52 against outward displacement.

The block 40, (see Figs. 1, 2 and 4), is extended laterally at 54 beyond the left side of the drum 10, and this extension has its front face channelled vertically to provide a slideway for a rack plate 55. Strips 56 and 57, secured by screws 58 to the block 40, and overlapping the front face of rack 55, complete the slideway for the rack plate, and hold the same against forward displacement. The vertical side edges of the rack plate are toothed as at 59 and 60. The teeth 59 on the right edge mesh with the teeth of pinion 52, and serve to rotate the latter when the rack is moved up or down. The teeth 60 on the left edge mesh with the pinion 61 on a stub shaft or pin 62 having bearing in a wing 63, (see Fig. 4), of the block 40. This pin 62 carries a finger-piece 64 keyed thereto, whereby to rotate the pinion 61, to raise or lower the rack plate at will; either by a quick movement to pass from long-shot to close-up, or vice versa; or by a slower movement to dissolve from long-shot to close-up, or vice versa. In Fig. 2 the close-up iris is shown as closed, and the long-shot iris as open; and the rack plate 55 is consequently in its uppermost position.

The face plate 49 has rectangular apertures 65 and 66 therethrough in registration with the apertures of the aperture plate 21. It serves as a mount for the photographing lens system. On the outer face of plate 49, and circumscribing the lower aperture 66 therein, is a ring 67, (see Figs. 1 and 3), on which is fitted and fixed a cylinder 68. Fitted and movable within the cylinder 68, (see Fig. 1), is a sleeve or cylinder 69 within which the long-shot lens aggregate is nested. A pin 70 on cylinder 69 protrudes through a cam slot 71 in cylinder 68, so that upon hand rotation of cylinder 69, the latter is moved longitudinally in cylinder 68 for focusing of the lens aggregate. The lens aggregate and focusing device may be of any suitable standard make.

In order that neither the holder for the close-up lens aggregate, nor that for the long-shot lens aggregate, may interfere with the view or light receivable by the other, it is desirable that the lens holders be spaced apart on plate 49 a greater distance than are the apertures 29 and 30 of the aperture plate 21. This may be accomplished, (see Fig. 3), by offsetting the close-up lens holder from the axis of the plate aperture 29, intended therefor, and by the use of a prism to deflect the light from the offset lens aggregate to the plate aperture.

In the drawings there is shown an oblique prism holder 72 of rectangular cross-section, (see Fig. 6), having a flange 73, secured by screws 74 to the plate 49 over the opening 65 in that plate. This prism holder at its lower end has an internal bead 75 for supporting and determining the home position of the prism. The prism 76, (see Figs. 3 and 5), is of the same shape as the oblique holder therefor, and slides into the latter from the top until it rests on bead 75, with its upper end at the upper end of its holder. A cup piece, (see Fig. 7), is then fitted onto the upper end of the prism casing. It has a base 77 apertured at 78 to receive the casing 72, and has flanges 79 whereby to be held to casing 72. It has an annular flange 80 whereby to receive and grip one of two telescoping members 81 and 82 which nest the close-up lens aggregate. This lens aggregate is not shown in detail, but like the long-shot lens aggregate, may be of any suitable standard make, and be focused by a pin 83 which protrudes from member 82 into a cam slot 84 in member 81 and so telescopes the member 82 in and out in the member 81, when member 82 is rotated by hand.

As shown in Fig. 4, the block 40 is extended in triangular form around one side of the drum 10; and, mounted upon or integral with this triangular extension is a housing 86 forming an open ended rectangular chamber 87 extending front to rear with respect to an object sighted. Block 40 has an aperture therethrough, (not shown), in registration with the front end of chamber 87; and, (see Fig. 2), the rack plate 55 has two apertures 88 and 89 therein, either of which, according to the position of the rack plate, may be in registration with the aperture in the block 40, and with the chamber 87. This housing 86 serves as a mount for a tube 90, (see Fig. 1), which carries the finder eye-piece, (not shown). A ground glass image plate 91 in the plane of the film, is slidably set into a guideway in a frame plate 92 secured by screws 93 to the rear end of housing 86.

The tube 90, which carries the eye-piece is not directly mounted on the housing 86, but is pivotly connected, as by a trunnion 94, to an open-ended box member 95, which fits over the housing 86 and is secured to the drum 10. Within the members 90 and 95, near the trunnion 94, are the usual prisms, (not shown), which co-act to pass the light from the image plate to the eye-piece in all angular settings of the eye-piece tube 90.

Except for the rack plate 55, with its two apertures 88 and 89, and parts carried thereby, all of the finder equipment just described, is old in the "Akeley" camera, and much of the detail is therefore not here shown or described. Other finding equipment may be employed.

Figure 2:
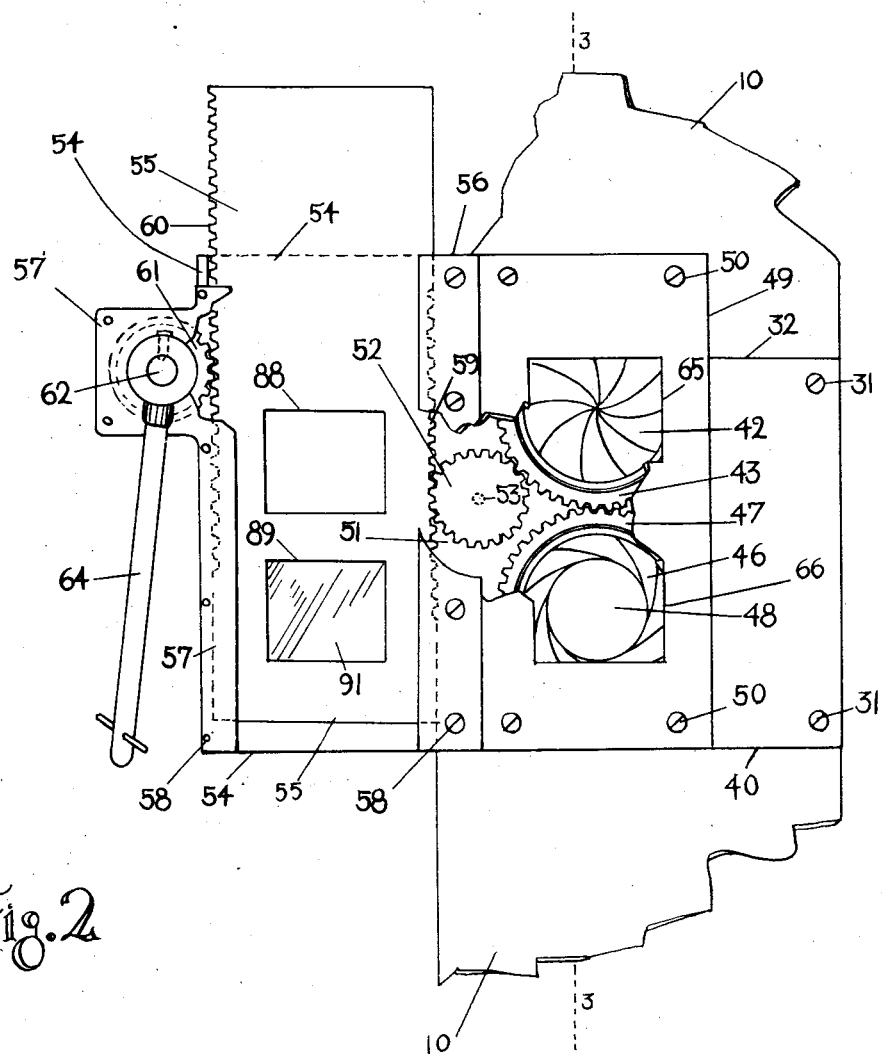
Fig. 2 is a view in front elevation of the camera of Fig. 1; the lens supports being removed for clearer view of underlying parts.

As shown in Figs. 1, 3 and 9, there is mounted on the front of rack 55, over the aperture 88 therein, a telescoping sighting tube 96 which carries a close-up finder-lens aggregate 97; and over the aperture 89 in the rack, is mounted a telescoping sighting tube 98 which carries a long-shot finder-lens aggregate 99. The gearing of rack 55 to pinion 52 and iris gears 43 and 47 is such that when the position of the rack is such that the camera is set for close-up work, the close-up lens aggregate 97 of the finder equipment registers with the image glass 91; and when the position of the rack is such that the camera is set for long-shot work, the long-shot lens aggregate 99 of the finder equipment registers with the image glass. Thus the mere setting of the irises for long-shot or close-up work suffices automatically to set the finder system for the selected class of work, and vice versa.

It has hereinbefore been stated that in the embodiment of the invention shown in Figs. 1 to 4, inclusive, of the drawings, there are two apertures 29 and 30 in the aperture plate, instead of the single aperture common to motion picture cameras. Because of the space occupied by the lens mountings, irises, drive gears, and other elements, the two apertures 29 and 30 are furthermore shown as spaced apart. It is ordinarily important that the spacing of the apertures be a multiple of the pitch of film feed. Otherwise, in the projection of the pictures, the feed of the film would not bring the views into proper registration with the apertures or windows of the projector. In Figs. 1 to 4, the apertures 29 and 30 are pitched apart two steps of film feed. If space in the machine permits, the pitch may be made more than two steps. The speed of film feed is such that when change is made from long-shot to close-up, or vice versa, no spacing of views on the film, corresponding to the spacing of the apertures of aperture plate 21, will be noticed.

For reasons that are apparent, light should not be admitted through either aperture 29 or 30 during the interval the film has its feed between exposures. This is the time the shutter is effective. In the ordinary "Akeley" camera, the one aperture is located at a point of the aperture plate midway of the two apertures 29 and 30 of the present invention; and the length of ribbon of the shutter 12 is such as to close the single aperture for the given interval between exposures. In a structure such as is here shown in the drawings, however, the ribbon piece of Fig. 8 would, for example, close the long-shot aperture 30 for that given interval of intended darkness, but before that interval had passed, would have cleared the close-up aperture to admit light through the latter; thus shortening the interval of total darkness and exposing the film to light while the same is being fed. Conversely considered, the close-up aperture 29 would be closed by the ribbon piece of Fig. 8 for the required interval of feed, but for an instant and until the ribbon reached the long-shot aperture, light would still be admitted through the latter, thus again shortening the interval of total darkness and exposing the film to light while it is being fed.

It is to meet these situations that the shutter wing or extension 18, (see Fig. 8), is provided. This is in effect an extension of the ribbon piece to assure blocking of light at both apertures 29 and 30 for the required interval of darkness and of film feed. This extension could be placed at either end of the ribbon, or in part at one end and in part at the other end. In practice, the problem will be met by simply lengthening the ribbon itself in the "Akeley" camera. In other cameras, the problem will be met according to circumstances.

It has been stated that instead of offsetting only one of the photographing lens aggregations, both may be offset from the corresponding apertures 29 and 30 of the aperture plate, and a prism employed for each lens aggregate, to deflect the light from the lenses to the apertures of the aperture plate. Such an arrangement is indicated more or less diagrammatically in Fig. 12.

In Fig. 12, the aperture plate is indicated at 21. An aperture of twice normal length is shown at 100. A diaphragm 101 divides it into halves, pitched apart one step of film feed. The casing for the close-up lens aggregate is indicated at 102, and that for the long-shot lens aggregate at 103. These are carried, respectively, by tubular members 104 and 105, similar to the member 72 of Figs. 1 and 6. Within member 104 is a prism 106, and within member 105 a prism 107. The base faces of the two prisms lie adjacent each other in the same plane at the aperture plate, each registering with one half of the aperture 100. For lighting effects, the prism 107 of the long-shot lens aggregate is shown as shorter than the prism 106 of the close-up lens aggregate.

In Figs. 1, 10 and 11 there is shown what has hereinbefore been referred to as a wiper. It is plate or strip 110, preferably of spring steel. When free of the drum it assumes a curvature of less radius than the drum; but when pressed against the drum it opens somewhat to fit against and to grip itself to the drum. A groove in the block 32 serves to hold it between the block and the drum. It has a lip 111 at one end, by means of which it may be moved up and down on the front face of the drum.

The wiper has two apertures 112 and 113 therethrough, of a size and so positioned that upon a shift of the wiper in one direction, its aperture 112 will register with plate aperture 29, and upon shift in the other direction, its aperture 113 will register with plate aperture 30. The apertures 112 and 113 are so spaced apart that, except during dissolve, light is admitted to one only of the plate apertures. It has been stated that when the apertures 29 and 30 of the plate 21 are pitched apart two steps of film feed, the apertures 112 and 113 of the wiper will preferably be pitched apart three steps of film feed. It follows from this that whenever an aperture of the plate 21 is in true registration with one of the apertures 112 and 113 of the wiper, the other plate aperture will be completely closed by that part of the wiper between the two apertures 112 and 113 thereof.

Assuming now, that wiper aperture 113, having been for a while in registration with plate aperture 30, for the taking of long-shot views, a close-up is desired. The wiper is moved downward, and as it is so moved, the part thereof between its apertures 112 and 113 begins to cross and close the plate aperture 30. Co-incidentally, wiper aperture 112 moves into registration with plate aperture 29. If the movement of the wiper is abrupt, the close-up is abruptly substituted for the long-shot on the film. By moving the wiper slowly, however, there is effected a "dissolve" from long-shot to close-up. If, from its lower position, the wiper is now moved back to its upper position, there is a return to the long-shot views, which may be abrupt, or may be a dissolve, according to the speed with which the wiper is moved.

In changing from the long-shot to the close-up views, and vice versa, the disappearing view may be made to appear as if it were being wiped out laterally, and the incoming view as if it were entering laterally. This illusion may be effected, as shown in Fig. 11, by having the wiper apertures 112 and 113 extended triangularly toward each other, as shown at 114 and 115. It is the inclined edges of these extensions which effect the lateral cut-off and inlet. Where such triangular extensions are present, the wiper apertures 112 and 113 may be pitched apart four, instead of three, steps of film feed, so that neither extension will admit light through its corresponding plate aperture at a time the latter is intended to be fully closed for the taking of pictures through the other plate aperture during the normal run of the film.

Other shapes may be given the wiper aperture extensions 114 and 115 for the production of other tricks or illusions of photography.

It is obvious that for effective use of the wiper in the particular embodiment of the invention shown in the drawings, the irises 42 and 46 should be so set that each, at the same time, is admitting a sufficiently strong light for the taking of pictures. Instead, therefore, of having the finger piece 64 in a position at either end of its stroke, as when one iris is to be completely open and the other completely closed, it may have an intermediate setting, where both irises are partly open.

I claim:

1. In a camera, a stationary long-shot lens aggregate, a stationary close-up lens aggregate, means for selectively rendering either of said lens aggregates effective and the other ineffective, a finder equipment comprising an image receiving plate, two finder lenses for use in conjunction with the image plate, one being for long-shot work and one for close-up work, means for registering one at a time said finder lenses with the image plate, and interconnections between said finder lens registering means and said lens aggregate selecting means, such that when the camera is set for long shot or close up, as the case may be, the appropriate finder lens registers with the image plate.

2. In a camera, a long-shot lens aggregate, a close-up lens aggregate, a shutter for each of said lens aggregates, a finder equipment comprising an image receiving plate, two finder lenses for use in conjunction with the image plate, one being for long-shot work and the other for close-up work, a carrier for the finder lenses, means for shifting the carrier to register one or the other of the finder lenses with the image plate, and means connected with the carrier for closing the shutter of one of the first above-named photographing lens aggregates and opening the other, according to the direction of shift of the carrier.

3. In a camera, a stationary long-shot lens aggregate, a stationary close-up lens aggregate, a plate apertured to provide passage for light therethrough from the lens aggregates, a shutter device actuatable to admit light through the plate by way of the long-shot lens aggregate while cutting off light therethrough by way of the close-up lens aggregate, and vice versa, a finder equipment comprising an image plate, a long-shot finder lens, a close-up finder lens, a carrier for the finder lenses, means for shifting the carrier to register one or the other finder lens with the image plate, and means connected with the carrier for actuating said shutter device.

4. In a camera, a long-shot lens aggregate, a close-up lens aggregate, a plate apertured to provide passage for light therethrough from the lens aggregates, a shutter device actuatable to admit light through the plate by way of the long-shot lens aggregate while cutting off light therethrough by way of the close-up lens aggregate, and vice versa, a finder equipment comprising an image plate, a long-shot finder lens, a close-up finder lens, means for registering one or the other of the finder lenses with the image plate, and connections for actuating in consonance the shutter device and said finder lens registering means, whereby the long-shot finder lens registers with the image plate when light is passable through the aperture plate from the long-shot lens aggregate and whereby the close-up finder lens registers with the image plate when light is passable through the aperture plate from the close-up lens aggregate.

5. In a camera, a long-shot lens aggregate, a close-up lens aggregate, a plate having two apertures, one for each lens aggregate to provide passages for light therethrough from the lens aggregates, a shutter device actuatable to admit light through the plate by way of the long-shot lens aggregate while cutting off light therethrough by way of the close-up lens aggregate, and vice versa, a finder equipment comprising an image plate, a long-shot finder lens, a close-up finder lens, holders for the finder lenses, means for shifting the holders to register one or the other finder lens with the image plate, and connections from the holders to the shutter device for operating the latter in consonance with the shift of the finder lenses.

6. In a camera, a long-shot lens aggregate, a close-up lens aggregate, means for selectively rendering either of said lens aggregates effective and the other ineffective, a finder equipment comprising an image plate, two finder lenses for use in conjunction with the image plate, one being for long-shot work and one for close-up work, a carrier for the two finder lenses, means for shifting the carrier to register one or the other of the finder lenses with the image plate, said selective means for the lens aggregates comprising a pinion, and a rack on the finder carrier in mesh with said pinion, whereby, as one or the other of the lens aggregates is selected, the finder lens consonant therewith is automatically moved to effective position.

7. In a camera, a stationary long-shot photographing lens aggregate, a stationary close-up photographing lens aggregate, selective means for at will rendering either of said lens aggregates effective and the other ineffective, an appropriate finder lens for each of said photographing lens aggregates, selective means for at will rendering either of said finder lenses effective, and connections between the photographing lens-selective means and the finder lens-selective means such that when the camera is set for long shot or close up, as the case may be, the appropriate finder lens is effective.

8. In a camera, a stationary long-shot photographing lens aggregate, a stationary close-up photographing lens aggregate, selective means for at will rendering either of said lens aggregates effective and the other ineffective, an appropriate finder lens for each of said photographing lens aggregates, a movable carrier for the two finder lenses, and interconnections between the carrier and said photographing lens-selective means such that when the camera is set for long shot or close up, as the case may be, the position of the carrier is such that the appropriate finder lens is in its effective position and the other finder lens in its ineffective position.

9. In a camera, a long-shot photographing lens aggregate, a close-up photographing lens aggregate, a shutter device actuatable selectively and at will to render one of said lens aggregates effective and the other ineffective, appropriate finder lenses, one for each of said photographing lens aggregates, means for selectively and at will rendering one of the finder lenses effective and the other ineffective, and connections from said last named selecting means to the shutter device co-ordinating the operations of such connected elements so that when the selected photographing lens aggregate is rendered effective the appropriate finder lens is also rendered effective.

10. In a camera, a long-shot photographing lens aggregate, a close-up photographing lens aggregate, means for at will dissolving views through the long-shot lens aggregate into views through the close-up lens aggregate, an appropriate finder lens for each of said photographing lens aggregates, selective means for at will rendering either of said finder lenses effective, and connections between the dissolving means and the finder selective means such that when the dissolve is to long-shot or close-up, as the case may be, the appropriate finder lens is effective.

THOMAS J. WALSH.